United States Patent [19]

Albertson

[11] Patent Number: 5,793,851
[45] Date of Patent: Aug. 11, 1998

[54] PAY TELEPHONE COMMUNICATION SYSTEM

[76] Inventor: David V. Albertson. 4144 Shoreline Dr., Spring Park, Minn. 55384

[21] Appl. No.: 61,249

[22] Filed: May 17, 1993

[51] Int. Cl.⁶ .................... H04M 15/00; H04M 17/00
[52] U.S. Cl. .................... 379/114; 379/143; 379/155
[58] Field of Search .................... 389/112, 13, 114, 389/115, 143, 144, 145, 154, 155

[56] References Cited

U.S. PATENT DOCUMENTS

| | | | |
|---|---|---|---|
| 4,788,718 | 11/1988 | McNass et al. | 379/115 X |
| 4,933,966 | 6/1990 | Hird et al. | 379/144 X |
| 4,942,604 | 7/1990 | Smith et al. | 379/145 X |
| 5,146,491 | 9/1992 | Silver et al. | 379/114 |
| 5,184,345 | 2/1993 | Salini | 379/114 X |
| 5,272,748 | 12/1993 | Davis | 379/154 X |

*Primary Examiner*—Paul Loomis

[57] ABSTRACT

A telephone communication system having a plurality of pay telephones operatively connected to a local telephone carrier, which in turn, is connected to a long distance carrier. The pay telephones are located in booths that contain advertising materials of business locations. The advertising materials have predetermined telephone numbers that are only associated with the selected advertised business location. The advertised telephone numbers are free from the pay telephone, which can be a conventional pay telephone or a smart pay telephone. All of the telephone calls to the selected business locations are monitored which information is used to render a statement and a monetary bill for the advertising and telephone calls to the business location.

12 Claims, 2 Drawing Sheets

5,793,851

PAY TELEPHONE COMMUNICATION SYSTEM

FIELD OF INVENTION

The invention relates to a method of verbal communication with a pay telephone and more particularly to the accommodation of advertising associated with the pay telephone and free telephone calls to selected business locations corresponding to the advertisers.

BACKGROUND OF INVENTION

Pay telephones are located within enclosure or telephone booths to provide the caller with some degree of privacy. The average pay telephone call is between one and three minutes. The caller is at or near the pay telephone with substantially no printed material to focus their attention on. Public pay phones are also used by callers for communicating with service businesses, such as taxis, hotels, motels and the like. The caller must use the designated amount of money, such as a quarter, to make the caller to the service business. Yellow page advertising materials are commonly used to locate the telephone numbers of the service businesses.

SUMMARY OF INVENTION

The invention is directed to a method of communication with the use of a pay telephone connected to selected business locations through a local telephone carrier and a long distance telephone carrier. The pay telephone is located in a booth that contains advertising materials of the proprietors of the selected business locations, such as a taxi, hotel, food or garage. Each business location is assigned a separate 1+800-XXX telephone number. The assigned telephone number, along with advertising material, is located adjacent the pay telephone where it is readily visible by the caller or user of the pay telephone. The telephone calls are advertised as free calls to the selected business locations. The free telephone calls are recorded by the long distance carrier. The data of the long distance carrier is monitored so that a statement can be rendered to each selected business for the cost of each telephone call, as well as the cost of the 1+800 service and the cost of advertising associated with each pay telephone.

The method of communication is also applicable to a pay telephone having a microprocessor with a local and fixed long distance software program connected to selected business locations through a local telephone carrier. The local telephone carrier is connected to the long distance carrier. The method comprises assigning a local telephone number to each selected business location. The assigned telephone number for each business location is used on advertising materials located adjacent the pay telephones to indicate to the caller that the telephone calls to the assigned telephone numbers are free to the caller. All telephone calls made via the assigned number are recorded as information in the microprocessor of each pay telephone. The data from the microprocessor is monitored so that all of the calls to the assigned telephone numbers can be used to render a statement to each selected business location for the cost of each telephone call from the assigned telephone number, as well as the cost of the advertising associated with each pay telephone.

DESCRIPTION OF PREFERRED EMBODIMENTS

Figure 1:
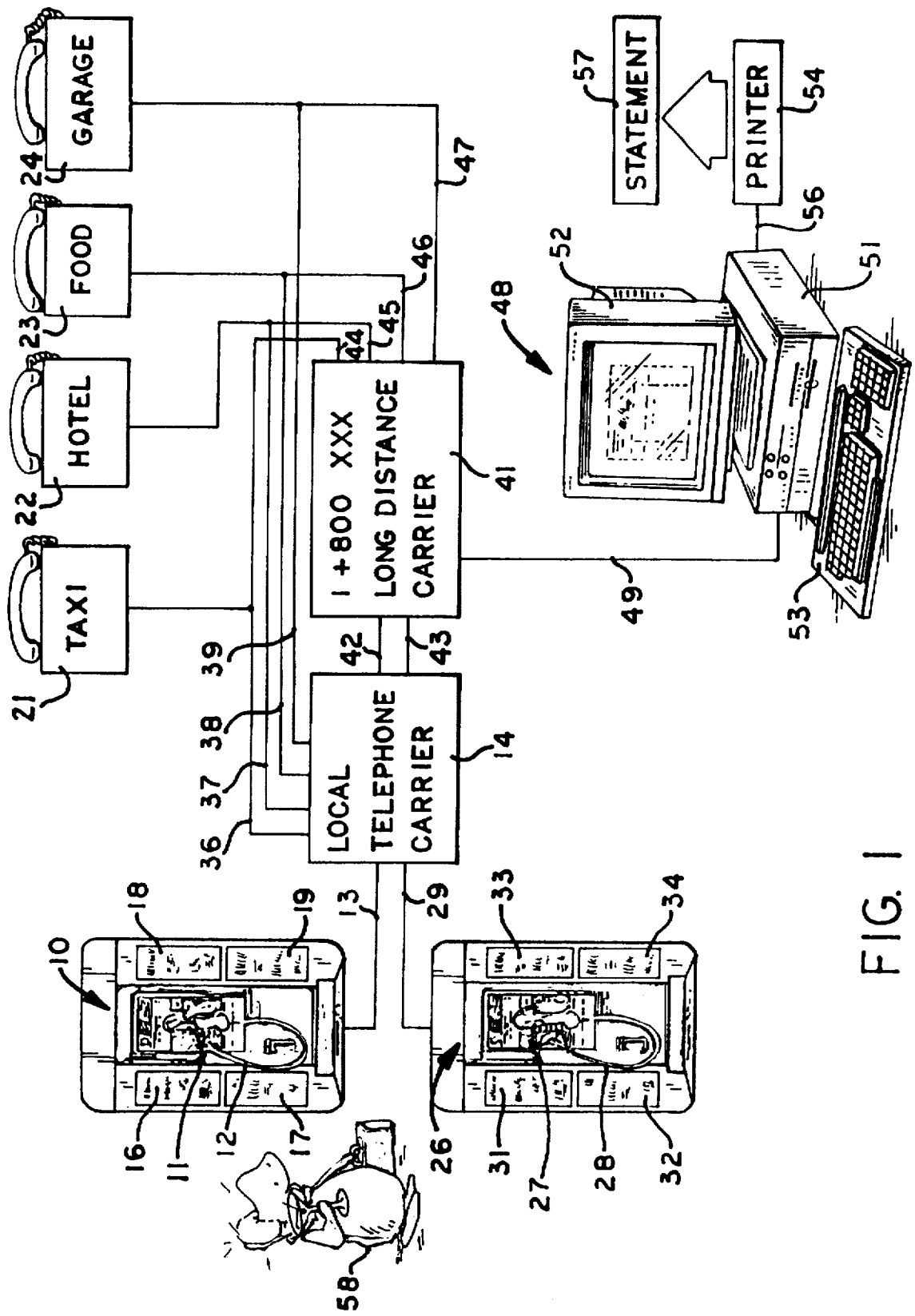
FIG. 1 is a diagrammatic view of the telephone communication system embodying the pay telephone the communication method of the invention.

Referring to FIG. 1, there is shown a telephone communication system, wherein caller 58 can make free telephone calls with the use of a conventional pay telephone indicated generally at 10 to advertise locations, such as a taxi business 21, a hotel 22, a food service or restaurant 23 or a garage 24. Pay telephone 10 is a conventional pay telephone having a hand set 11 operatively connected with the telephone box with a cord 12. A conventional cable or line 13 couples telephone 10 to local telephone carrier 14, such as the local Bell Telephone Company. Pay telephone 10 is mounted in a booth or housing that accommodates advertising signs or boards 16, 17, 18 and 19. Boards 16–19 can be printed materials located within frames mounted on the pay telephone housing. Other structures can be used to attach boards 16–19 to the housing. Boards 16–19 contain advertising materials and/or illustrations along with telephone numbers, which do not require caller 58 to pay a coin, such as a quarter, to complete the telephone call to the advertiser. The advertisers are illustrated as advertising the services of a taxi, hotel, food or garage 21–24. Other types of businesses can advertise their services and products on separate boards associated with the pay telephone housing. The advertisers rent the advertising space on the boards for a period of time, such as 3 months at $20.00 per month as determined by agreement with the pay phone location, owner or lessee. The business telephones of the business locations 21–24 are connected to local telephone carrier 14 with optic fibers, lines or cables 36, 37, 38 and 39 respectively. Lines 36, 37, 38 and 39 are the conventional telephone lines between locations 21–24 and local telephone carrier 14.

A second conventional pay telephone 21, located within a booth or housing is connected with a line of cable 29 to the local telephone carrier 14. Telephone 26 has a hand set 27 and cord 28. A plurality of advertising signs or boards 31–34 are mounted on the enclosure for the telephone 26. Signs 31–34 have advertising materials and telephone numbers that correspond with the taxi, hotel, food and garage 21–24. Additional pay telephones can also be associated with enclosures that contain advertising materials that are associated with the businesses of the taxi, hotel, food and garage 21–24.

The local telephone carrier 14 is connected in the conventional manner with lines or cables 42–43 to the long distance carrier 41. Long distance carrier 41 includes a 1+800-XXX telephone service. Lines or cables 44, 45, 46 and 47 connect the long distance carrier 41 to the telephones in the taxi, hotel, food and garage 21–24 respectively.

A remote data processing center, indicated generally at 48, is coupled to long distance carrier 41 with a line or cable 49. Data processing center 49 has a computer 51 connected to a monitor 52 and keyboard 53. A printer 54 is connected with a cable 56 to computer 51. Printer 54 operates to generate printed statements 57 for each of telephone call that is made to businesses 21–24 by caller 58 using the free telephone call numbers listed on the advertising materials, board or signs 16–19. The advertising cost and the cost of the phone call is included in the statements 57 sent to businesses 21–24.

In use, each of advertising signs 16–19 and 31–34 have advertising materials for the service offered by businesses 21–24 along with 1+800 telephone numbers. Each of the businesses is assigned a different 1+800-XXX number which are free to caller 58. Caller 58, desiring a taxi service, will call the 1+800 number for the taxi business 21. A coin, such as a quarter or equivalent thereof, is inserted into the coin mechanism of the pay telephone to turn on the telephone. Caller 58 then dials the 1+800-XXX number to complete the call. The coin is returned to the caller. The telephone calls from pay phones 10 and 26 to businesses 21-24 are monitored by the remote data processing center 28 from information stored by the long distance carrier 41. The cost of the 1+800-XXX service plus the cost of the charges of the long distance carrier for each phone call are billed to the remote data processing center 48. Statement 57, generated by the remote data processing center 48, includes the long distance 1+800-XXX costs, the cost of each phone call at $.25 per call and the cost of the advertising sign associated with each pay telephone.

Figure 2:
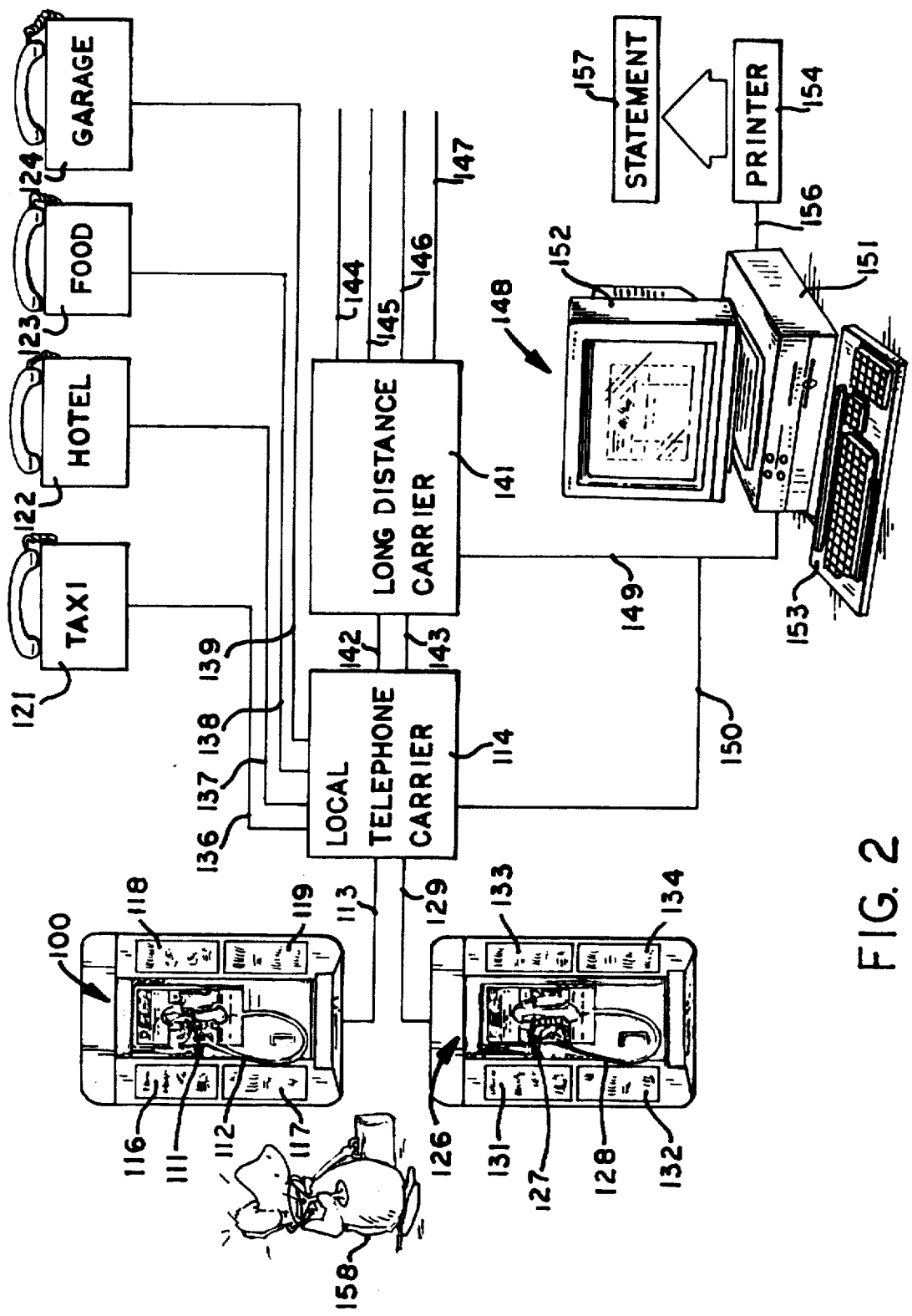
FIG. 2 is a diagrammatic view of a modification of the telephone communication system embodying the pay telephone communication method of the invention.

Referring to FIG. 2, there is shown a modification of the telephone communication system, having private pay telephones 100 and 126. These pay telephones, known as smart phones, include microprocessors including local and fixed rate long distance software programs. The fixed rate long distance program can be a quarter per minute to all telephones in the United States of America. The remote data processing center 48 has a software program that can directly monitor the operation and telephone calls from pay telephones 100 and 126.

Pay telephone 100 has a receiver 11 connected with cord 112 to the telephone electronics, including the microprocessor. A cable or line 113 connects telephone 100 to local telephone carrier 114. Cables or lines 142 and 143 connect local telephone carrier 114 to long distance carrier 141. Pay telephone 126 also has a receiver 127 connected with a cable 128 to the electronics within the telephone. The pay telephones 100 and 126 are located within enclosures that include advertising signs or boards 116, 117, 118, 119 and 131, 132, 133, 134. These advertising materials contain advertising for a business such as a taxi 121, hotel 122, food service 123 and garage 124. The advertising materials also contain the phone numbers which allow free phone calls to the businesses 121-124. These phones are connected with the lines 137-139 to the local telephone carrier 114. The data processing center 148 is also connected with a line 150 to local telephone carrier 114, so that the data processor 141 can directly access the information in the microprocessors within pay telephones 100 and 126.

Remote data processing center 148 is connected with a line 148 to the long distance carrier 141 so that long distance charges for each of the telephones can be monitored. The long distance carrier directly charges the owner or vendors of the pay telephones 100 and 126 for the long distance charges.

Remote data processing center 148 has a computer 151 coupled to a monitor 152 and keyboard 153. Cable 156 connects computer 151 with printer 154, which generates printed statements 157 for businesses 121-124. Statements 157 include the cost of advertising signs 116-118 and 131-134, as well as any additional advertising signs associated with other pay telephones and a charge of $.25 for each free call made by user 158 to a particular business. The owner of the data processing center can return a portion of the income to the owner or vendor of pay telephones 100 and 126. The owner of the pay telephones 100 and 126 can be the owner and operator of the remote data processing center 148.

In use, each of advertising signs 116, 117, 118 and 119 associated with pay phone 100 and advertising signs 131, 132, 133 and 134 associated with pay phone 126 has advertising materials for services offered by businesses 121-124 along with the telephone number that is specific to each of the selected businesses. Caller 158 uses a coin, such as a quarter or the equivalent thereof, that is inserted into the coin mechanism to turn on the pay telephone. Caller 158 dials the telephone number of one of the advertisers and completes the call. The coin returns to caller 158. The telephone calls from pay telephones 100 and 126 to each of the businesses is stored in the memory of the microprocessor of each telephone. Each telephone can be monitored by the remote data processing center 148 from the data stored in each of the microprocessors of each pay telephone. The information obtained from monitoring each pay phone is used to render a statement to each of the selected businesses for the cost of each telephone call to the selected business as well as the cost of the advertising associated with each pay telephone.

While there has been shown and described preferred embodiments of the apparatus and method of communication with the use of a pay telephone and a data processing center, it is understood that changes in the method of communication may be made by those skilled in the art without departing from the invention. The invention is defined in the following claims.

I claim:

1. A method of communication with a pay telephone connected to selected business locations through a local telephone carrier and a long distance telephone carrier: assigning a separate 1+800-XXX telephone number to each business location, placing the assigned telephone numbers on advertising materials located adjacent the pay telephone and indicating to the caller that telephone calls to the assigned telephone numbers are free to the caller, recording the telephone calls of the assigned telephone numbers by the long distance carrier, monitoring and recording all telephone calls of the assigned telephone numbers that are handled by the long distance carrier, and accessing the recorded telephone calls and rendering a statement to each selected business location for the cost of each telephone call to each selected business location, cost of 1+800-XXX service, and cost of advertising associated with each selected pay telephone.

2. The method of claim 1 wherein: the monitoring of all telephone calls of the assigned telephone numbers including recording the telephone number of each pay telephone and each assigned telephone number coming from each pay telephone.

3. The method of claim 1 wherein: the rendering of a statement to each business location that includes a record of each pay telephone used to make telephone calls to the selected telephone number of each business location and a monetary charge for each telephone call.

4. The method of claim 1 wherein: the rendering of a statement to each business location that includes a record of each pay telephone used to make the telephone calls to the selected telephone number of each business location and charge of $.25 for each telephone call.

5. The method of claim 1 wherein: the monitoring of all telephone calls of the assigned telephone numbers includes recording the telephone phone numbers of each pay telephone and each assigned telephone number coming from each pay telephone, and the rendering of a statement to each business location that includes a record of each pay telephone used to make the telephone calls to the selected telephone numbers of each business location and a monetary charge for each telephone call.

6. The method of claim 5 wherein: the monetary charge for each telephone call is $.25.

7. A method of communication with a smart pay telephone having a telephone communication software program connected to selected business locations through a local telephone carrier, said local telephone carrier being connected to a long distance carrier: assigning a local telephone number to each selected business location, placing the assigned telephone number on advertising materials located adjacent the pay telephones and indicating to the caller that telephone calls to the assigned telephone numbers are free to the caller, recording all telephone calls to the assigned telephone number as information in each smart pay telephone, monitoring the information in each smart pay telephone of all telephone calls to the assigned telephone numbers, and accessing the monitored information and rendering a statement to each selected business location for the cost of each telephone call to the assigned telephone number from each pay telephone for the cost of each telephone call and the cost of advertising associated with each pay telephone.

8. The method of claim 7 wherein: the monitoring of all telephone calls of the assigned telephone numbers including recording the telephone number of each pay telephone and each assigned telephone number coming from each pay telephone.

9. The method of claim 7 wherein: the rendering of a statement to each business location that includes a record of each pay telephone used to make telephone calls to the selected telephone number of each business location and a monetary charge for each telephone call.

10. The method of claim 7 wherein: the rendering of a statement to each business location that includes a record of each pay telephone used to make the telephone calls to the selected telephone number of each business location and charge of $.25 for each telephone call.

11. The method of claim 7 wherein: the monitoring of all telephone calls of the assigned telephone numbers includes recording the telephone phone numbers of each pay telephone and each assigned telephone number coming from each pay telephone, and the rendering of a statement to each business location that includes a record of each pay telephone used to make the telephone calls to the selected telephone numbers of each business location and a monetary charge for each telephone call.

12. The method of claim 11 wherein: the monetary charge for each telephone call is $.25.

\* \* \* \* \*